United States Patent [19]

Riese

[11] 4,351,851
[45] Sep. 28, 1982

[54] METHOD FOR FREEZE-STABILIZING WINE

[75] Inventor: Hans M. Riese, Lund, Sweden

[73] Assignee: Alfa-Laval Inc., Poughkeepsie, N.Y.

[21] Appl. No.: 177,138

[22] Filed: Aug. 11, 1980

[51] Int. Cl.³ .............................................. C12H 1/00
[52] U.S. Cl. ..................................... 426/524; 62/532; 99/277.2; 165/65; 210/774; 426/15; 426/495
[58] Field of Search ...................... 426/524, 330.4, 490, 426/15, 384, 422, 478, 495; 99/277.1, 277.2; 62/537, 536, 532, 533; 165/65, DIG. 25; 210/737, 738, 774

[56] References Cited

U.S. PATENT DOCUMENTS 4,015,020  3/1977  Nagasawa et al. ................... 426/15
4,112,128  9/1978  Fessler ............................ 426/330.4

OTHER PUBLICATIONS

Cooper et al, Food Engineering, Nov. 1976, (pp. 73-75).

*Primary Examiner*—Raymond N. Jones
*Assistant Examiner*—George C. Yeung
*Attorney, Agent, or Firm*—Cyrus S. Hapgood

[57] ABSTRACT

A method for freeze-stabilizing wine and a system for carrying out this method are described. The method is of a type in which the wine is first chilled so that ice crystals are formed in the wine while the wine is still pumpable, whereupon the wine is conveyed to a residence tank in which tartrate crystals are formed. The wine is then heated to melt the ice crystals, whereupon the tartrate crystals formed are removed from the wine. The method according to the invention is characterized in that the wine is conveyed continuously to and from the residence tank, where the wine is agitated in such a way that there is maintained a homogeneous suspension of ice crystals and tartrate crystals in wine. It is advantageous to stir the wine with a horizontally pivoted stirrer which rotates at a relatively low speed. Suitable operating conditions are obtained if the wine is first chilled to a temperature which is 0.2° to 5° C. below the freezing point of the wine, and if the residence time in the tank is 15-150 minutes as an average.

6 Claims, 1 Drawing Figure

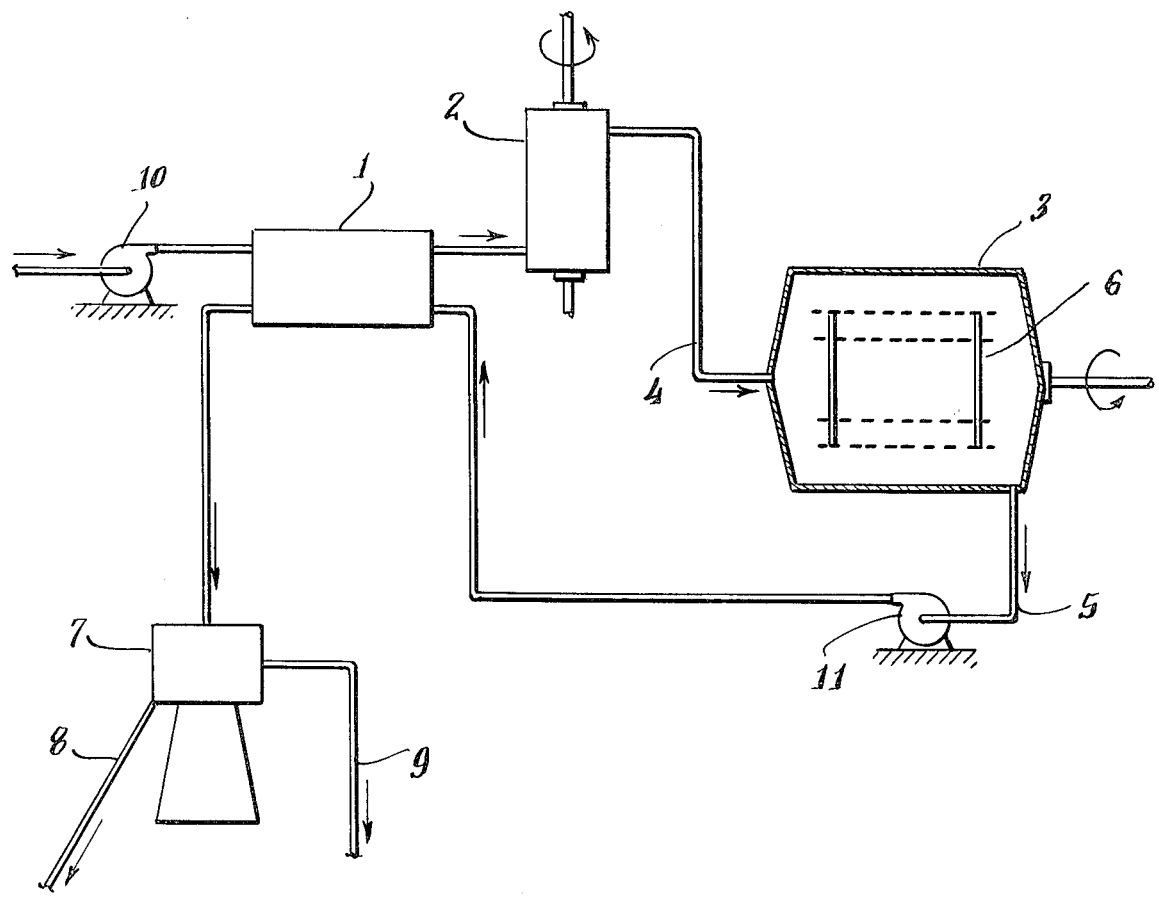

METHOD FOR FREEZE-STABILIZING WINE

The present invention relates to a method of freeze-stabilizing wine in which the wine is chilled to a first temperature where ice crystals are formed in the wine but the wine is still pumpable, whereupon the wine is conveyed to a residence tank in which tartrate crystals are formed. The wine is then heated to a second temperature at which the ice crystals melt, whereupon the so-formed tartrate crystals are removed from the wine. The invention also relates to a system for carrying out the method.

By "freeze-stabilization" is meant a method in which tartrates (salts of tartaric acid) are removed from the wine in order that it can be stored in a refrigerator without precipitation of such tartrates, which would be visible as an objectionable haze in the wine.

Within the wine industry, it has formerly been necessary to store the wines at relatively low temperature for about one month to be safe so that said precipitation does not occur. By the application of more modern techniques, like heat exchangers with a mechanically scraped cooling surface (so-called scraped-surface heat exchangers), a freezing stabilization method was made possible which limited the needed storage time to about 5-6 days, which meant a step forward. Such a method is disclosed in Food Engineering, Nov. 1976, and forms the prior art from which the present invention was developed. Within the wine industry, there has been a desire for even shorter residence times and a continuous method. In the method disclosed in Food Engineering, the residence tank operates discontinuously. The wine is filled in, with the ice crystals formed, whereupon this mixture is left resting for about one week while the tartrate crystals are formed. Simultaneously the ice crystals melt more or less completely, so that the wine becomes pumpable.

The principal object of the present invention is to provide a method of the above-mentioned type in which a short residence time is applied and which operates continuously. According to the invention, such a method is characterized in that the wine is conveyed continuously to and from the residence tank where the wine is agitated in such a way that there is maintained a homogeneous suspension of ice crystals and tartrate crystals in wine.

It is especially suitable to maintain the homogeneous suspension in the tank by a stirring means rotating around a substantially horizontal axis.

Suitable operational conditions mean that the wine is chilled to a first temperature which is 0.2° C. to 5° C. below the freezing point of the wine.

In one suitable embodiment of the method, the wine is chilled to a first temperature at which 1 to 50% ice is formed in the wine.

The wine is suitably held for 15-150 minutes in the residence tank. An apparatus for carrying out the method according to the invention comprises at least one heat exchanger for chilling the wine to form ice crystals therein, a residence tank, a heat exchanger for heating the wine to melt the ice crystals, and means for removal of the formed tartrate crystals. The residence tank is formed substantially rotationally symmetrical and cylindrical, and it is oriented with its symmetry axis substantially horizontal, the residence tank being provided with stirring means pivoted around its symmetry axis.

In one suitable embodiment, the stirring means is arranged to rotate at 5-25 rpm.

The invention will now be described more in detail, reference being made to the accompanying drawing in which the single illustration is a schematic view of a system for carrying out the method according to the invention. The system comprises a first heat exchanger 1 in the form of a regenerative plate heat exchanger, a so-called scraped surface heat exchanger 2 which is provided with a rotationally symmetrical, cylindrical cooling surface and with a rotor having blades which rotate in contact with the cooling surface, and a residence tank 3. The latter has a central inlet 4, a tangential outlet 5 and a stirrer 6 consisting of axial blades attached to arms radiating from a horizontally pivoted axis arranged symmetrically in the rotationally symmetrical, cylindrical residence tank. The system also comprises a centrifugal separator 7 of the type having a sludge discharge 8 and an outlet 9 for clear liquid and two pumps 10 and 11. As is obvious from the drawing, there is formed a circuit from pump 10, heat exchangers 1 and 2, residence tank 3, pump 11 and heat exchanger 1, the centrifugal separator 7 being arranged in the way of the outgoing flow from heat exchanger 1.

The following are examples of the new method:

EXAMPLE 1

A wine is chilled in heat exchanger 1 from +15° C. to −5° C. The freezing point of the wine is −5° C. In scraped surface heat exchanger 2 the wine is chilled further to −8° C., about 10% (weight) of ice crystals being formed. The wine with ice crystals is conveyed to residence tank 3, which is dimensioned to give an average residence time of 2 hours. As residence tank 3 is heat insulated, the temperature will not rise during the residence time, during which stirrer means 6 rotates at about 12 rpm in order to maintain a homogeneous suspension of ice crystals and tartrate crystals, which are formed gradually. This homogeneous suspension is recirculated to the regenerative heat exchanger 1, the incoming wine heating the suspension so that the ice crystals will melt, and the wine will attain a temperature of +4° C. The tartrate crystals formed are separated in centrifugal separator 7. A sludge is discharged at outlet 8 and the freeze-stabilized wine leaves through outlet 9.

EXAMPLE 2

Another wine with the freezing point −6° C. is chilled in heat exchanger 1° to −6° C. and in scraped surface heat exchanger 2° to −7.5° C. After precipitation of tartrate crystals in residence tank 3, which is stirred also in this case by stirrer means 6 at about 12 rpm, with an average residence time of 1⅔ hours, the wine is heated regeneratively in heat exchanger 1° to 9.5° C., whereupon the tartrate crystals are separated in centrifugal separator 7.

In both examples, a completely storage-stable wine is obtained which does not show, even after several weeks storage in a refrigerator, any haze.

It may be mentioned that the word "wine" in this context also includes grape juices, sparkling wines, wines with a high ethanol content and spirits. As examples of the freezing points of the liquors, the following may be mentioned:

Grape juices: 0° to −3° C.

Wines: −3° to −7° C.

Sparkling wines: −3° to −7° C.

Wines with a high ethanol content: −6° to −15° C.

Spirits: −15° to −25° C.

I claim:

1. A method for freeze-stabilizing wine, which comprises chilling the wine to a first temperature at which ice crystals are formed in the wine but while the wine is still pumpable, continuously conveying the chilled wine to a residence tank and there forming tartrate crystals in the wine, agitating the wine in said tank in order to maintain a homogeneous suspension of ice crystals and tartrate crystals in the wine, continuously passing the wine and the suspension of ice and tartrate crystals from said tank through a heating zone, heating and the suspension in said zone to a second temperature at which the ice crystals melt while retaining the tartrate crystals, and removing said tartrate crystals from the wine.

2. The method of claim 1, in which the homogeneous suspension is maintained in the tank by stirrer means rotating around a substantially horizontal axis.

3. The method of claim 1, in which said first temperature is 0.2° C. to 5° C. below the freezing point of the wine.

4. The method of claim 1, in which said first temperature is such as to form 1 to 50% of ice in the wine.

5. The method of claim 1, in which the wine is an average of 15 to 150 minutes in said tank.

6. The method of claim 1, in which said first temperature is 0.2° C. to 5° C. below the freezing point of the wine and is such as to form 1 to 50% of ice in the wine, the wine being held in said residence tank for a period of 15 to 150 minutes.

* * * * *

UNITED STATES PATENT AND TRADEMARK OFFICE
CERTIFICATE OF CORRECTION

PATENT NO. : 4,351,851
DATED : September 28, 1982
INVENTOR(S) : Hans Martin Riese It is certified that error appears in the above—identified patent and that said Letters Patent is hereby corrected as shown below:

Column 2, line 53, " 1 2/3" should be--1½--.

Column 3, line 17, --the wine--should be inserted before "and".

Signed and Sealed this

Fourteenth Day of February 1984

[SEAL]

Attest:

GERALD J. MOSSINGHOFF

Attesting Officer   Commissioner of Patents and Trademarks